United States Patent [19]
Dinitz

[11] 3,907,353
[45] Sept. 23, 1975

[54] ADJUSTABLE BUMPER INCLUDING PROTECTION AGAINST UNDER-RIDE

[76] Inventor: Arthur M. Dinitz, 6 Rustic Ln., Westport, Conn. 06880

[22] Filed: May 13, 1974

[21] Appl. No.: 469,670

[52] U.S. Cl. .................................... 293/81; 293/90
[51] Int. Cl.² ......................................... B60R 21/14
[58] Field of Search .................... 293/1, 73, 90, 81; 214/75 T

[56] References Cited
UNITED STATES PATENTS

| | | | |
|---|---|---|---|
| 1,232,220 | 7/1917 | Cheatham | 293/90 X |
| 1,620,256 | 3/1927 | Heise | 214/757 |
| 2,990,212 | 6/1961 | Nicastro | 293/73 X |
| 3,537,727 | 11/1970 | Tantlinger et al. | 293/73 X |
| 3,674,115 | 7/1972 | Young et al. | 293/1 X |

Primary Examiner—Lloyd L. King
Assistant Examiner—Gene A. Church
Attorney, Agent, or Firm—Lackenbach, Lilling & Siegel

[57] ABSTRACT

This invention provides an adjustable, protective bumper, especially designed for a vehicle, or the like, having an elevated body which is susceptible to being under-ridden during a rear-end collision by another vehicle. The adjustable protector bumper protects against under-ride and further has provision for absorbing or dissipating the energies of the impact so as to minimize damage to property and injury to persons in the event of such collision. The bumper comprises a hanging support for connecting the bumper to the rear portion of a vehicle body or the like; a rear structure vertically adjustably connected to the hanging support and extending downwardly therefrom; support means, for example a platform, for energy dissipating, impact protection means, connected to the lower rigid structure; and a plurality of adjustable reinforcing struts forming a triangulated reinforcement from the lower rigid structure designed and adapted to be connected at one portion of the strut to a vehicle body and from two other portions of the triangulated strut to the lower rigid structure; and adjustment means for varying the length of these struts.

8 Claims, 6 Drawing Figures

ADJUSTABLE BUMPER INCLUDING PROTECTION AGAINST UNDER-RIDE

The provision of a suitable protective bumper for a truck, or other highway obstruction, having an elevated body, which can be under-ridden by other vehicles using the roadway, has long been held as a desirable objective by those specializing in highway safety. This problem is especially troublesome for road-servicing and maintenance trucks, especially those of the dump-truck variety, which are large, heavy vehicles having a high ground clearance at the rear between the bottom of the body and the road surface. Such trucks, while servicing or maintaining the roads, often move far more slowly than the highway traffic or may even be parked along one lane of the road as warning and protection for a work crew farther down the road. The slow moving vehicles include, for example, those vehicles used for painting of highway lines for lanes on large highways.

A problem which often arises, especially on heavily travelled, highly curved roads, is that cars often fail to see the truck in sufficient time to avoid crashing into the rear of the truck. For the high-bodied truck, this often results in the car bumper and hood under-riding the rear of the truck and the upper portion of the body, i.e., the windshield, crashing into the chasis of the truck, often resulting in serious injury and even decapitation of the occupants of the passenger vehicle. In order to avoid this calamitous result, many types of apparatus have been tried which range from simple steel skirts, extending downwardly from the rear of the truck body, to more elaborate devices, including impact attenuating, or cushioning means, connected to the rear of the truck and extending downwardly towards the road surface. The former devices, i.e., the simple skirts, are generally insufficient to prevent injury and damage when struck by a fast moving automobile and in fact are often pushed inward and fail to prevent the serious damage to the upper portion of the fast moving automobile. The latter, more elaborate devices, for example of the type shown in the journal *Public Works*, Mar. 1973, page 84, often created serious problems in use, including interfering with the operation of the servicing truck when used under varying load conditions.

This invention provides means to overcome the problems of the prior devices so as to provide a means for protecting oncoming vehicles in the event of a collision with the rear end of a high-bodied truck or other slow-moving vehicle, or other slow-moving or stationary obstruction along the highway, one which permits ready adjustment for use on a variety of different vehicles having different vertical clearances or on the same vehicle under differing load conditions and thus differing ground clearances and attitudes relative to the ground level.

In accordance with the present invention, there is provided an adjustable, protective bumper for a vehicle or the like, having an elevated body susceptible to being under-ridden by an oncoming vehicle, the bumper further having the preferred capability of dissipating energy upon impact; the bumper comprising: a hanging support structure comprising connecting means designed and adapted to be coupled to the rear portion of a high-bodied vehicle body; a lower rigid structure comprising a plurality of vertically aligned rigid members, adjustably connected to and extending downwardly from the support structure, the adjustable connection permitting the vertical adjustment of the lower structure; support means for energy-dissipating, impact-protection means, the support means being connected to the lower rigid structure; a plurality of reinforcing struts, each being designed and adapted to form a triangulated reinforcement between the lower rigid structure and the vehicle body, one portion of each strut being connected to the lower-most portion of the lower rigid structure, a second portion of each strut being connected at a second, more elevated location on the lower rigid structure, and a third portion of each strut being designed and adapted to be connected to a vehicle or the like, adjacent the lower portion of the elevated vehicle body; and adjustment means on each strut, designed and adapted to permit varying the length of each strut between the portions connected to the lower rigid structure and the portion designed and adapted to be connected to the vehicle. The above structure permits the lower rigid structure to be maintained at a desirable distance above the ground and a desirable attitude with respect to the ground, regardless of the attitude and elevation of the vehicle body.

In a preferred embodiment, the bumper comprises as the support means a platform rigidly connected to, and extending horizontally and transversely away from, the lower rigid structure; the platform being especially designed for supporting energy-dissipating cushioning means, preferably of the fluid or hydraulic type.

The accompanying drawings depict a preferred embodiment and example of the protective bumper in accordance with the present invention.

FIG. 5 is a magnified partial view in section of a portion of the protective bumper taken along lines 5—5 of FIG. 3; and FIG. 6 is a sectional view taken along lines 6—6 of FIG. 5.

Figure 1:
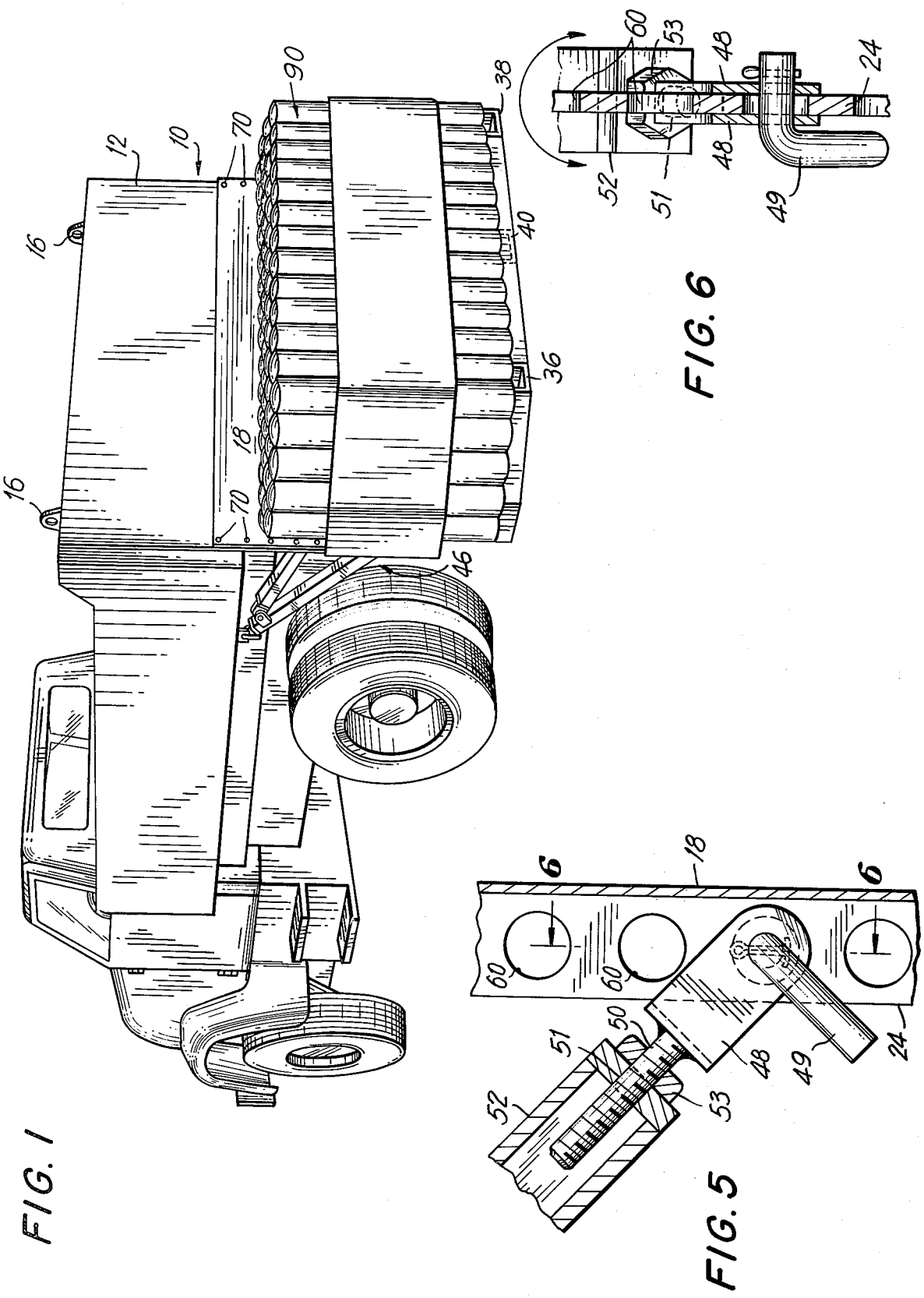
FIG. 1 is a perspective view of a high-bodied dump truck type of vehicle, including the protective bumper in accordance with the present invention.
Figure 2:
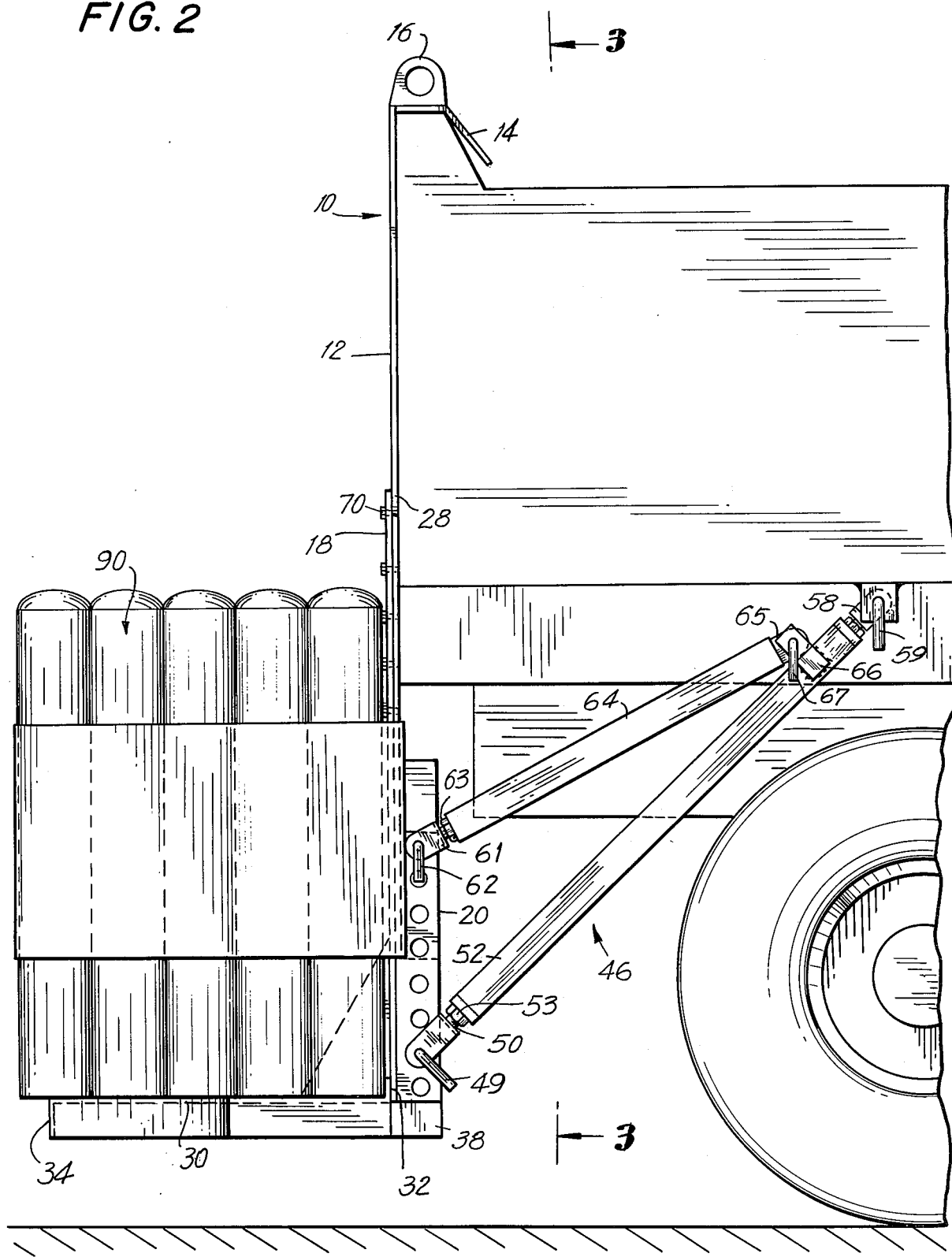
FIG. 2 is a partial elevated side view of the dump truck of FIG. 1, showing the rear portion of the truck and the protective bumper in accordance with the present invention.
Figure 3:
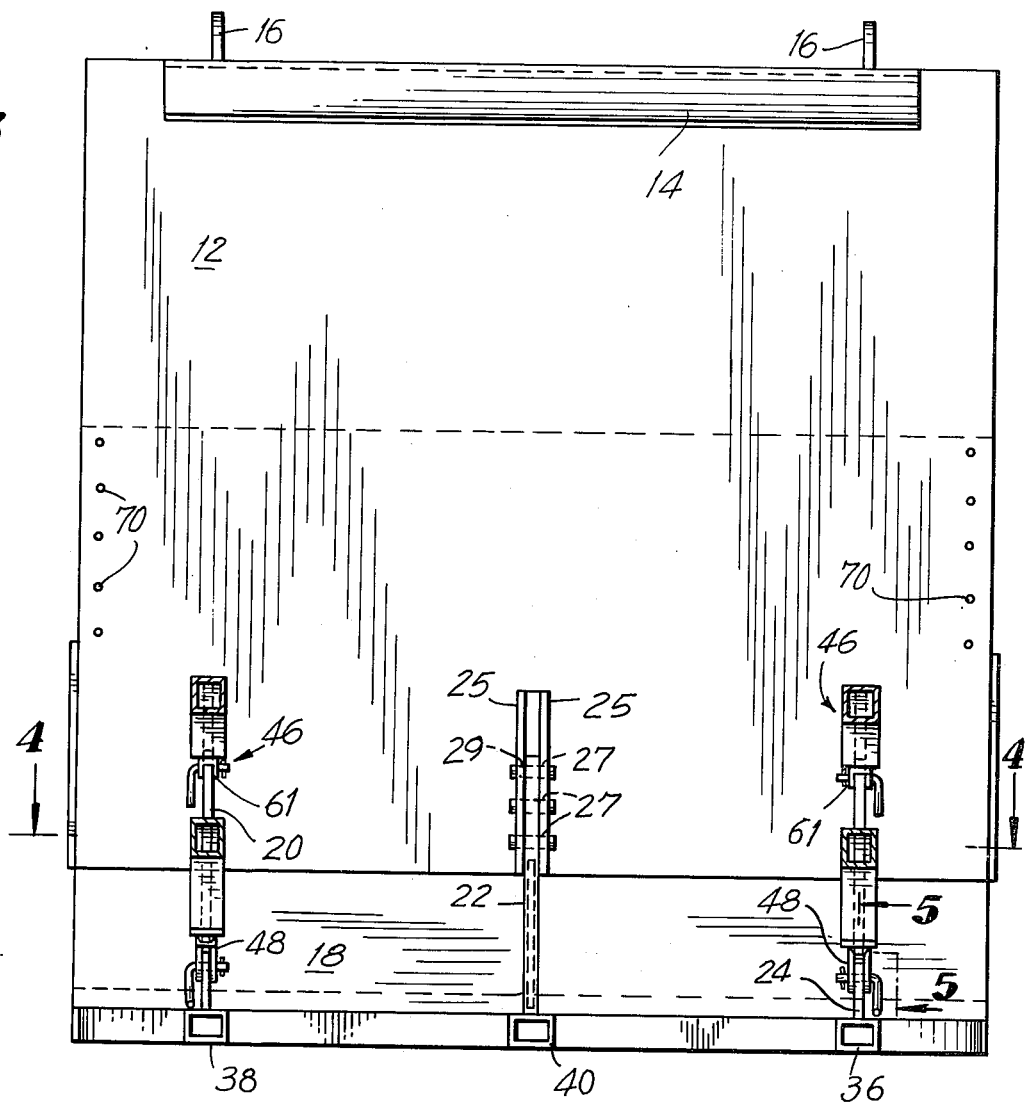
FIG. 3 is a rear elevation view of the protective bumper along lines 3—3 of FIG. 2.
Figure 4:
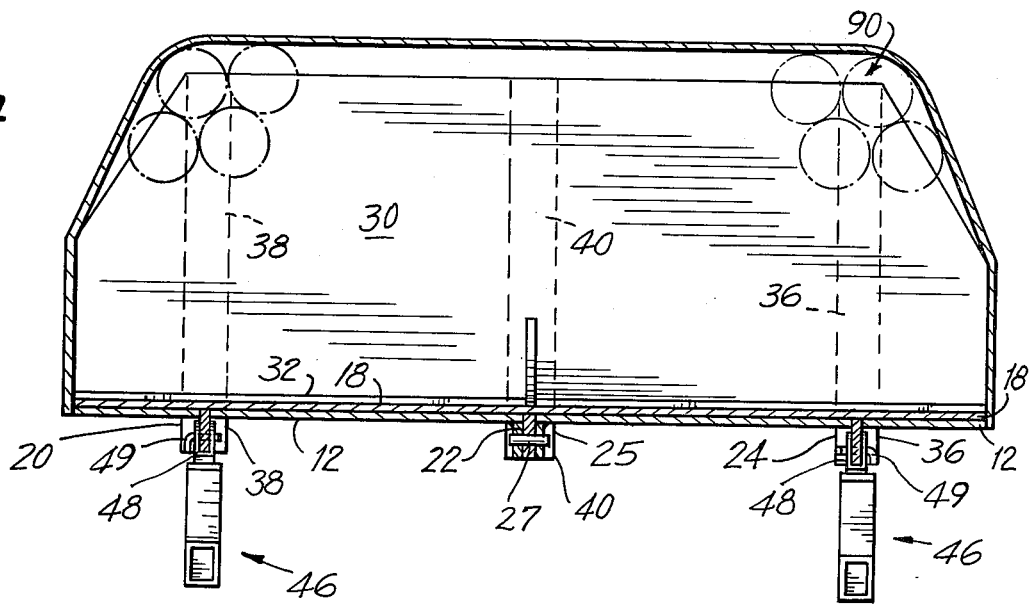
FIG. 4 is a sectioned view of the protective bumper viewed along lines 4—4 in FIG. 3.

Referring to the accompanying drawings, the adjustable, protective bumper in accordance with the present invention, shown most generally in the perspective view of FIG. 1, comprises a support structure indicated generally by the numeral 10, which hangs from the rear of the dump truck body shown in FIGS. 1 and 2. The hanging support structure 10 comprises a generally flat, substantially vertically aligned upper plate member 12 in unitary combination with a down-turned lip portion 14, which fits over and is supported by the upper portion of the dump truck tailgate. At the apex of the overturned lip portion are two eye pieces 16, suitable for connection to, for example, a crane or other carrying means for lifting and removing or emplacing the bumper means over the rear of the truck body.

The upper plate 12 is removably and adjustably connected to the lower rigid plate 18. As shown in the drawings, the upper rigid plate 12 is juxtaposed against the front-facing surface of the lower rigid plate 18. Rigidly connected to the front surface of the lower rigid support plate 18, are three vertically extending rigid columns 20, 22 and 24. The vertically aligned rigid columns 20, 22, 24, can be connected to the lower rigid plate 18 by, for example, welding. Three slots are formed extending vertically upwardly from the lower edge of the upper plate 12, aligned with the three rigid vertical columns 20, 22, 24, so that the three columns 20, 22, 24, can slide within the confines of the three slots. The central slot, i.e., surrounding the central rigid column 22, in addition, is bounded by two rigid vertical bars 25, rigidly connected to the forwardmost surface of the upper plate 12, and extending forewardly therefrom; each bar is provided with a plurality of orifices 29 extending transversely therethrough and aligned with similar orifices formed within the central rigid column 22. Located on the outer edges of both the upper plate 12 and the lower plate 18 and extending therethrough are a plurality of orifices 28 aligned so that an orifice on upper plate 12 is juxtaposed against an orifice on plate 18. Threaded nut and bolt members 27 are placed within the orifices 29 and bolt and nut members 70 are placed within the orifices 28. A horizontal platform 30 extends horizontally rearwardly from the lower rigid plate 18, to which it is rigidly connected, as by welding, for example. As shown, especially in FIG. 2, the forwardmost portion of the platform 30 is bent upwardly to form an upstanding portion 32 which is rigidly attached, as by welding, to the lower rigid plate 18. The rearwardmost portion of the platform 30 is bent downwardly to form a skirt portion 34, having two openings therethrough. Extending forwardly from each opening in the skirt 34, and rigidly connected to the underportion of the platform 30, are two box beams 36, 38, which extend beneath, and are rigidly connected with, the two outer rigid vertical columns 20, 24, connected to the lower plate 18.

A third box beam 40, located intermediate of and running parallel to the box beams 36, 38, extends from the rear portion of the horizontal platform 30, to which it is rigidly connected, forwardly to beneath the central rigid column 22, to which it is also rigidly connected.

Two triangulated reinforcing struts, generally indicated by the numeral 46, connect the lower portion of the bumper to the truck body. A U-channel member 48 is placed around each rigid vertical column 20 and 24. Each U-channel member 48 had a hole at the apex of each side and is held in place around the rigid vertical columns 20, 24, by the locking pins 49, held in place, in turn, by a cotter pin. Each U-channel member 48 is rigidly attached to a threaded bolt member 50, which, in turn, is in threaded connection with a turn-buckle cylinder 52, having a threaded opening at its lower end 51. A locking nut 53 is in threaded inter-engagement with the threaded bolt 50, intermediate the U-channel 48 and cylinder 52. The second end of the turn-buckle cylinder 52 is connected by an identical threaded arrangement to a straight bar 58, which is in turn connected, via the locking pin 59, to a U-channel 158 welded to the truck, thus forming a completed turn-buckle assembly. As shown in the drawings, U-channel 158 is connected to the chassis of the truck, adjacent the dump truck body. This avoids interfering with dump truck action.

A second turn-buckle assembly is formed comprising yet another U-channel 61, connected by a locking pin 62 to each of the outer vertical rigid columns 20, 22, at a location vertically above the connection of U-channel 48. U-channel 61 is rigidly connected to a threaded bolt member, which in turn is threaded into the turn-buckle cylinder 64, in a manner identical to that shown in FIG. 5. A locking nut 63 is also provided. The second end of turn-buckle cylinder 64 is rigidly connected, as by welding, to a straight bar 65, which in turn is connected between a pair of bars 66 by a locking pin 67. The pair of bars 66 are in rigid connection, as by welding, to the turn-buckle cylinder 52. In the embodiment shown in the accompanying drawings, there are two triangulated reinforcing struts 46, one connected to each of the outer rigid vertical columns 20, 24. The connections between the U-channels and the vertical columns 20, 24, and the truck body, made utilizing the locking pins 49, are each of a rotatable, or pivoting, nature. A similar rotatable, or pivoting, joint is formed between the U-channel 65 and the bar member 66.

In the embodiment shown, the platform support means 30 has resting thereon a battery of hydraulic buffer-type impact cushioning means 90. Although any type of impact cushioning means can be utilized in accordance with the present invention, the hydraulic cushions of the type shown and as described more explicitly, for example, in U.S. Pat. Nos. 3,284,122; 3,512,822; 3,503,600; 3,514,800 and 3,545,802, are most preferred. It is also within the scope of the present invention to provide in addition to, or in place of, the cushion means on the platform 30, shock absorbing means as part of, or in linear connection with, the triangulated reinforcing strut means 46. Thus, the turn-buckle cylinder 52 can include along its length a shock absorbing, or damping, cylinder arrangement which would resist and cushion any impact from the rear of the vehicle tending to push the bumper forwardly, i.e., towards the front portion of the truck, and thus preventing under-riding of the truck by the automobile and reducing or limiting damage.

In operation, the entire adjustable protective bumper can be picked up by, for example, an overhead crane through eyelets 16 or utilizing, for example, a fork-lift truck, wherein the fork extends into the openings of the box beams 36 and 38. The bumper is placed over and rested upon the upper edge of the dump truck gate and the carrying means, i.e., crane or fork-lift truck, withdrawn. The triangulated reinforcing struts 46 are each then connected as follows: U-channel 58 is pivotally connected to the truck body, utilizing locking pin 59; channel 48 is then pivotally connected to the vertical rigid column 20, 24, utilizing locking pin 49, which passes through the aligned holes within U-channel 48 and the lower portion of the column 20, 24. When the distance between the truck body connecting point and the column 20, 24 is not precisely correct, the U-channel 48 can be moved inwardly and outwardly with respect to the turn-buckle cylinder 52 so as to reach the desired length. Once this initial connection is made, turn-buckle cylinder 52, including the shorter turn-buckle cylinder 64, can be rotated either clockwise or counterclockwise so as to lengthen or shorten the distance between the U-channels 48 and 58, respectively, until the platform 30 is in a desired attitude relative to the ground level. Generally, it is preferred that the platform 30 be substantially parallel to the ground, i.e., completely horizontal, and the vertical support plates 12 and 18 be completely vertical, i.e., perpendicular to the ground level. Once this correct attitude has been achieved, the U-channel 61 is then connected to the vertical column 20, 24, utilizing the pin 62 through the aligned holes at the apices of the U-channel 61 and the upper portion of the column 20, 24. Again, if the length between the U-channel 61 and the bar 66 is not precisely that required to permit the above alignment, the strut length can be varied by rotating the U-channel 61, and thus the threaded bolt to which it is connected, in a clockwise or counterclockwise direction, as explained above.

It is further pointed out that in the event the load on the truck is varied, i.e., so as to cause the rear of the truck to reach a different height and attitude relative to the ground, the reinforcing struts can be readjusted so as to correct for this new attitude of the truck and to maintain the platform 30 in the desired horizontal position. Further, the vertical height of the platform 30 can be varied by lifting the lower portion, for example, with a fork lift truck into the box beams 36, 38, after removing the bolts 70, which hold the upper rigid plate 12 to the lower rigid plate 18, and the bolts 27 which hold the central vertical column 22 to the vertical bars 25. The vertical position of the platform can then be adjusted and the bolts replaced to lock the platform in its new position. It should be pointed out that the number of orifices in the plates and the vertical columns and their distance apart determines the scope and precision of this vertical adjustment.

The impact cushions, which can be utilized for the bumper in accordance with the present invention, include not only the hydraulic type as shown, but also a battery of other cushions filled, for example, with sand or indeed empty barrels, wherein the collapsing of the barrel structure itself provides the desired impact cushioning. These and other known equivalents, or those which are to be developed in the future, can be utilized for providing the necessary energy absorption or impact attenuation for the bumper, under-ride preventer, in accordance with the present invention.

It is generally preferred that the lowermost portion of the bumper be at least about 5 in. above the road surface and preferably from about 6 to about 10 in. above the road.

The embodiments and examples and alternatives thereof disclosed and suggested by the above description and the accompanying drawings are intended to be merely exemplary of the scope of the present invention and should not be limiting thereof. The following claims set forth the scope of the present invention.

What is claimed is:

1. An adjustable, protective bumper for a vehicle, or the like, having an elevated body, designed and adapted to protect against under-ride and to dissipate energy upon impact; the bumper comprising:
   A. a hanging support structure comprising connecting means for coupling the same to the rear portion of the elevated body;
   B. a lower rigid structure comprising a plurality of vertically aligned rigid members, adjustably connected to and extending downwardly from the support structure, the adjustable connection permitting the vertical adjustment of the lower structure;
   C. support means for supporting energy-dissipating, impactprotection means, the support means being connected to the lower rigid structure;
   D. a plurality of reinforcing struts, each strut being designed and adapted to form a triangulated reinforcement for the lower rigid structure, one portion of each strut being connected to the lowermost portion of the lower rigid structure, a second portion of each strut being connected at a second, more elevated location on the lower rigid structure, and a third portion of each strut being designed and adapted to be connected adjacent the lower portion of the elevated body; and
   E. adjustment means for each strut, designed and adapted to permit varying the length of each strut between the portions connected to the lower rigid structure and the third portion;
   whereby, the lower rigid structure can be maintained at a desirable attitude with respect to the ground, regardless of the attitude of the vehicle, by adjusting the adjustment means.

2. The bumper of claim 1, wherein the support means for the energy-dissipating, impact-protection means comprises a substantially horizontal platform rigidly connected to the lowermost portion of the lower rigid structure and extending outwardly therefrom in a direction away from the reinforcing strut.

3. The bumper of claim 1, wherein the reinforcing strut is pivotally connected to the lower rigid structure at the first and second portions and wherein the third portion of a strut is designed and adapted to be removably and pivotally connected to the elevated body.

4. An adjustable protective bumper to protect against under-ride and to dissipate energy of impact, for a vehicle having an elevated body, the bumper comprising:
   a substantially vertically aligned lower plate;
   a substantially vertically aligned upper plate vertically adjustably connected to the lower plate and substantially parallel thereto and overlapping the upper portion thereof; the upper plate having a plurality of vertically aligned parallel slots therethrough extending upwardly from the bottom edge thereof;
   a substantially horizontal platform, rigidly connected to the lower vertical plate and extending horizontally rearwardly therefrom;
   a plurality of vertical columns rigidly connected to the horizontal platform and to the lower plate extending upwardly from the platform parallel to the lower plate, each column being juxtaposed within a corresponding parallel slot within the upper plate;
   connecting means, rigidly connected to the upper portion of the upper plate, designed and adapted to be coupled to the tailgate of a truck vehicle body;
   a plurality of reinforcing struts forming a triangulated reinforcement for the bumper, one portion of each strut being connected to the lowermost portion of a column, a second portion of each strut being connected to a second portion of the same column at a location vertically above the first portion, and a third portion of a strut being designed and adapted to be removably connected to a vehicle at a location adjacent the lowermost portion of the body of the vehicle; and
   adjustment means for each strut, designed and adapted to permit varying the length of each strut between the portions connected to the column and the portion designed and adapted to be connected to the vehicle, whereby the platform is maintained horizontal regardless of the attitude of the vehicle.

5. A bumper in accordance with claim 4, further comprising a battery of impact-cushioning means supported on said horizontal platform.

6. A bumper in accordance with claim 5, wherein the adjustment means comprises a turnbuckle assembly on each strut.

7. An adjustable, protective bumper for a vehicle, or the like, having an elevated body, designed and adapted to protect against under-ride and to dissipate energy upon impact; the bumper comprising:
- A. a hanging support structure designed and adapted to be coupled to the rear portion of the elevated body and comprising a substantially vertically aligned upper plate having a bent downturned lip along the uppermost portion thereof designed and adapted to fit over and rest upon the upper edge of the tailgate of a dumptruck type vehicle;
- B. a lower rigid structure comprising a plurality of vertically aligned rigid members, adjustably connected to and extending downwardly from the support structure, the adjustable connection permitting the vertical adjustment of the lower structure;
- C. support means for energy-dissipating, impact-protection means, the support means being connected to the lower rigid structure;
- D. a plurality of reinforcing struts, each strut being designed and adapted to form a triangulated reinforcement for the lower rigid structure, one portion of each strut being connected to the lowermost portion of the lower rigid structure, a second portion of each strut being connected at a second, more elevated location on the lower rigid structure, and a third portion of each strut being designed and adapted to be connected adjacent the lower portion of the elevated body; and
- E. adjustment means for each strut, designed and adapted to permit varying the length of each strut between the portions connected to the lower rigid structure and the third portion;

whereby, the lower rigid structure can be maintained at a desirable attitude with respect to the ground, regardless of the attitude of the vehicle, by adjusting the adjustment means.

8. The bumper of claim 7, wherein the lower rigid structure comprises in addition a lower plate vertically aligned and substantially parallel to the upper plate and overlapping the lower portion of the upper plate, and further wherein, the upper plate surface defines a plurality of vertically aligned parallel slots extending from the bottom edge thereof upwardly along the plate, and further wherein, the lower plate is rigidly connected to the vertically aligned rigid members, which are in juxtaposed relation to the upper plate so as to be aligned with and fit within the confines of the plurality of slots in said upper plate; whereby when the lower plate is adjusted vertically with respect to the upper plate, the vertical rigid members slide within the plurality of slots.

* * * * *